United States Patent
Miglio et al.

(10) Patent No.: US 9,296,628 B2
(45) Date of Patent: Mar. 29, 2016

(54) PROCESS FOR THE PURIFICATION OF AN AQUEOUS STREAM COMING FROM THE FISCHER-TROPSCH REACTION

(75) Inventors: Roberta Miglio, Oleggio (IT); Lino Locatelli, Vigevano PV (IT); Palma Pizzocchi, legal representative, Vigevano PV (IT); Oliviero Perotti, legal representative, Vigevano PV (IT); Ines Perotti, legal representative, Vigevano PV (IT); Serafino Tonani, legal representative, Abbiategrasso MI (IT)

(73) Assignee: ENI S.p.A., Rome (IT)

( * ) Notice: Subject to any disclaimer, the term of this patent is extended or adjusted under 35 U.S.C. 154(b) by 723 days.

(21) Appl. No.: 13/318,498

(22) PCT Filed: Apr. 22, 2010
(Under 37 CFR 1.47)

(86) PCT No.: PCT/EP2010/002491
§ 371 (c)(1),
(2), (4) Date: Mar. 26, 2013

(87) PCT Pub. No.: WO2010/127773
PCT Pub. Date: Nov. 11, 2010

(65) Prior Publication Data
US 2014/0102981 A1  Apr. 17, 2014

(30) Foreign Application Priority Data
May 6, 2009  (IT) ............... MI2009A0769

(51) Int. Cl.
*B01D 15/00* (2006.01)
*C02F 1/44* (2006.01)
(Continued)

(52) U.S. Cl.
CPC .............. *C02F 1/448* (2013.01); *B01D 61/362* (2013.01); *C01B 3/38* (2013.01); *C10G 2/32* (2013.01);
(Continued)

(58) Field of Classification Search
CPC .. B01D 61/362; B01D 5/006; B01D 2323/12; C02F 1/448; C02F 1/04; C02F 9/00; C02F 1/447; C02F 1/048; C02F 3/286
USPC ................................... 210/650, 640
See application file for complete search history.

(56) References Cited

U.S. PATENT DOCUMENTS 5,230,801 A * 7/1993 Darnell ................ B01D 61/362
210/500.38

(Continued)

FOREIGN PATENT DOCUMENTS

| WO | 2004 096952 | 11/2004 |
| WO | 2005 113426 | 12/2005 |

(Continued)

OTHER PUBLICATIONS

U.S. Appl. No. 13/254,621, filed Nov. 14, 2011, Franzosi, et al.

(Continued)

*Primary Examiner* — Ana Fortuna
(74) *Attorney, Agent, or Firm* — Oblon, McClelland, Maier & Neustadt, L.L.P.

(57) ABSTRACT

Process for the purification of an aqueous stream coming from the Fischer-Tropsch reaction which comprises feeding said aqueous stream to one or more pervaporation units obtaining an aqueous stream enriched in oxygenated organic compounds (retentate side) and an aqueous stream enriched in water (permeate side), feeding said aqueous stream enriched in oxygenated organic compounds to a saturator obtaining a gaseous stream leaving the saturator, feeding said gaseous stream to a synthesis gas production plant. Said process allows at least a part of the aqueous stream coming from the Fischer-Tropsch reaction to be used as process water in a synthesis gas production plant, subsequently sent to a Fischer-Tropsch plant for the production of hydrocarbons.

20 Claims, 1 Drawing Sheet

(51) Int. Cl.
  *C02F 9/00* (2006.01)
  *B01D 61/36* (2006.01)
  *C01B 3/38* (2006.01)
  *C10G 2/00* (2006.01)
  *B01D 63/00* (2006.01)

(52) U.S. Cl.
  CPC ..... *B01D 2311/08* (2013.01); *C01B 2203/0233* (2013.01); *C01B 2203/062* (2013.01); *C01B 2203/148* (2013.01)

(56) References Cited

U.S. PATENT DOCUMENTS

| | | | | |
|---|---|---|---|---|
| 6,620,320 | B1* | 9/2003 | Hying | B01D 53/228 210/490 |
| 7,153,432 | B2* | 12/2006 | Kohler | B01D 61/04 203/39 |
| 7,156,831 | B2* | 1/2007 | Otsubo | A61F 13/5512 604/385.24 |
| 7,166,219 | B2* | 1/2007 | Kohler | C02F 9/00 210/601 |
| 7,276,105 | B2* | 10/2007 | Pruet | 95/52 |
| 8,974,671 | B2* | 3/2015 | Miglio et al. | 210/663 |
| 8,999,164 | B2* | 4/2015 | Franzosi et al. | 210/603 |
| 2005/0139555 | A1 | 6/2005 | Dancuart et al. | |
| 2007/0010590 | A1* | 1/2007 | Abbott et al. | 518/703 |
| 2007/0173670 | A1* | 7/2007 | Rix | B01D 61/362 568/671 |
| 2008/0119574 | A1* | 5/2008 | Islam | C07B 63/00 518/728 |
| 2009/0246114 | A1 | 10/2009 | Sah et al. | |
| 2011/0100819 | A1 | 5/2011 | Miglio et al. | |
| 2011/0127155 | A1 | 6/2011 | Carnelli et al. | |
| 2011/0147313 | A1 | 6/2011 | Miglio et al. | |
| 2011/0209391 | A1 | 9/2011 | Miglio et al. | |
| 2013/0008774 | A1* | 1/2013 | Carnelli et al. | 203/38 |
| 2013/0256117 | A1* | 10/2013 | Carnelli | C02F 1/04 203/96 |
| 2013/0299334 | A1* | 11/2013 | Carnelli | C02F 1/04 203/10 |
| 2014/0102981 | A1* | 4/2014 | Miglio et al. | 210/640 |

FOREIGN PATENT DOCUMENTS

| | | |
|---|---|---|
| WO | 2007 081212 | 7/2007 |
| WO | WO 2010/002831 * | 3/2010 |

OTHER PUBLICATIONS

U.S. Appl. No. 13/140,586, filed Jun. 17, 2011, Locatelli, et al.
International Search Report Issued Jun. 1, 2010 in PCT/EP10/002491 Filed Apr. 22, 2010.

* cited by examiner

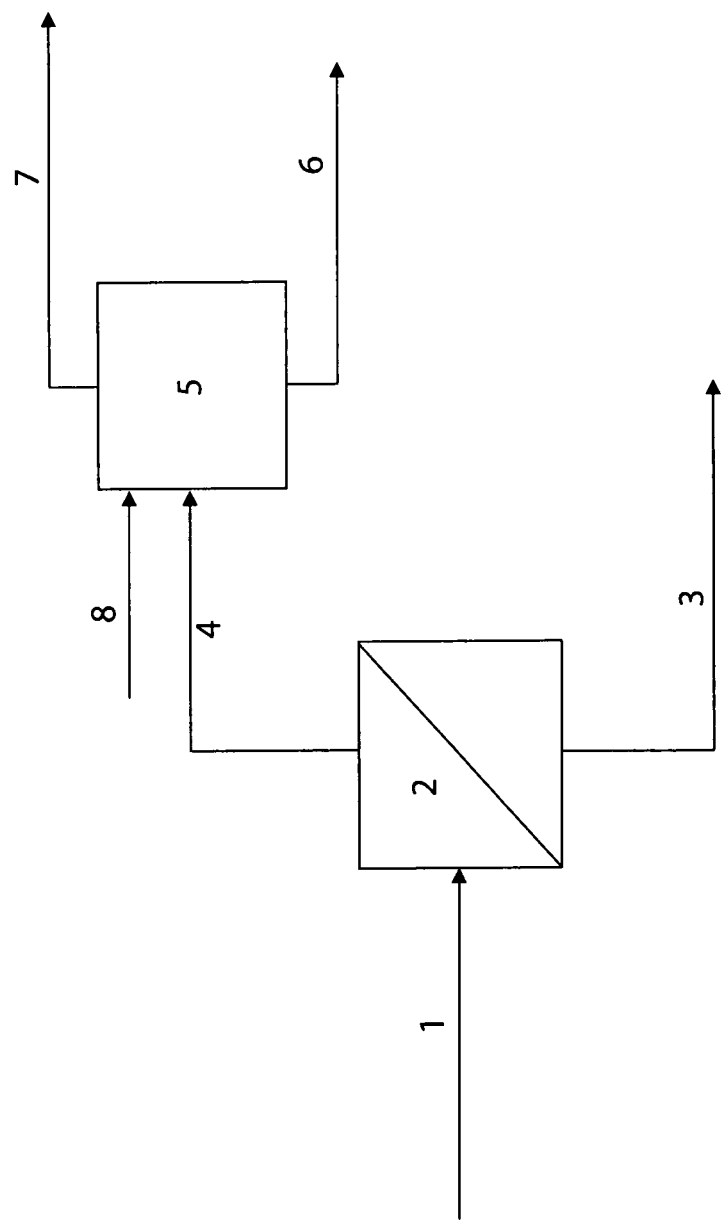

PROCESS FOR THE PURIFICATION OF AN AQUEOUS STREAM COMING FROM THE FISCHER-TROPSCH REACTION

The present invention relates to a process for the purification of an aqueous stream coming from the Fischer-Tropsch reaction.

More specifically, the present invention relates to a process for the purification of an aqueous stream coming from the Fischer-Tropsch reaction which comprises feeding said aqueous stream to one or more pervaporation units obtaining an aqueous stream enriched in organic compounds (retentate side) and an aqueous stream enriched in water (permeate side), feeding said aqueous stream enriched in organic compounds to a saturator obtaining a gaseous stream leaving the saturator, feeding said gaseous stream to a synthesis gas production plant.

The Fischer-Tropsch technology for preparing hydrocarbons from mixtures of gases based on hydrogen and carbon monoxide, conventionally known as synthesis gas, is known in scientific literature. A compendium which summarizes the main works on the Fischer-Tropsch reaction is contained in the Bureau of Mines Bulletin, 544 (1955) entitled "Bibliography of the Fischer-Tropsch Synthesis and Related Processes" H. C. Anderson, J. L. Wiley and A. Newell.

The Fischer-Tropsch technology is generally based on the use of slurry reactors, which are used in chemical reactions that are carried out in multiphase systems in which a gaseous phase is bubbled into a suspension of a solid (solid phase) in a liquid (liquid phase). In the case of Fischer-Tropsch reaction, the gaseous phase comprises the synthesis gas or "syngas", which is a combination of hydrogen ($H_2$) and carbon monoxide (CO), with a molar ratio $H_2/CO$ ranging from 1 to 3, preferably about 2, the liquid phase, at the reaction temperature, prevalently comprises the reaction product, i.e. essentially linear hydrocarbons with a high number of carbon atoms, and the solid phase prevalently comprises the catalyst. The synthesis gas can optionally contain smaller amounts of carbon dioxide ($CO_2$) and/or water. The presence of sulfur, nitrogen, halogens, selenium, phosphorous and arsenic, or their derivatives, in said synthesis gas, is not desirable. For this reason, and depending on the quality of the synthesis gas, it is preferable to remove the sulfur and the other contaminants, before feeding said synthesis gas to the Fischer-Tropsch reactor. Methods for removing these contaminants are known in the art. The use of protection beds known as "guard beds" based on zinc oxide, are preferred for the removal of sulfur or its derivatives. Furthermore, it is generally preferable to remove the carbon dioxide ($CO_2$) which is optionally formed, from the synthesis gas, as also the sulfur or its derivatives not yet removed. For this purpose, for example, the synthesis gas can be put in contact with a moderately alkaline solution (e.g., a solution of potassium carbonate) in a packed column.

The synthesis gas preferably comes from steam reforming and/or from the partial oxidation of natural gas, typically methane, or of other heavier hydrocarbons optionally present in natural gas (e.g., ethane, propane, butane), according to processes known in the art.

In a steam reforming process, the desulfurized natural gas is generally mixed with steam and is passed, operating at a high temperature and pressure, through a catalytic bed comprising a catalyst containing a transition metal, preferably nickel. The steam is usually supplied by means of a saturator in which water is put in contact with the above preheated natural gas.

Alternatively, the synthesis gas can derive from other production processes such as, for example, from autothermal reforming or from the process known as C.P.O. (Catalytic Partial Oxidation) which use streams of high-purity oxygen or enriched air together with the desulfurized natural gas and the catalyst, or from the gasification of coal or of other carbonaceous products, with steam at a high temperature as described, for example, in "Catalysis Science and Technology", Vol. 1, Springer-Verlag, New York, 1981.

In the Fischer-Tropsch reaction, the carbon monoxide and hydrogen are converted to water and organic molecules mainly containing carbon and hydrogen (i.e. hydrocarbons). Furthermore, other organic molecules which contain oxygen in addition to carbon and hydrogen, called oxygenated compounds, can be formed during the Fischer-Tropsch reaction.

The Fischer-Tropsch reaction is normally carried out at temperatures equal to or higher than 150° C., for example ranging from 180° C. to 350° C., maintaining a pressure ranging from 0.5 MPa to 10 MPa, preferably from 1 MPa to 5 MPa, inside the reactor.

As mentioned above, the Fischer-Tropsch reaction is facilitated by a catalyst. The catalysts preferably have the function of increasing the reaction rate without being used up during the reaction itself. The type of catalyst influences the relative amounts of the hydrocarbons obtained from the Fischer-Tropsch reaction. The catalysts normally used in the Fischer-Tropsch reaction generally contain at least one metal belonging to groups 8, 9, or 10, of the Periodic Table of Elements (in the IUPAC notation dated Jun. 22, 2007).

Catalysts containing cobalt, iron, ruthenium, and/or nickel, can be advantageously used for the conversion of synthesis gas to hydrocarbons suitable for the production of gasoline and/or diesel. Cobalt, for example, is particularly suitable for Fischer-Tropsch catalysts for the production of heavy hydrocarbons from synthesis gas. Iron has the advantage of being easily available and relatively economical but has the disadvantage of increasing the reaction known as "water-gas-shift", which converts a part of the carbon monoxide and water produced into carbon dioxide and hydrogen. Nickel favours the termination reaction and is advantageously used for the selective production of methane from synthesis gas. Ruthenium has the advantage of a high activity but is rather costly.

The Fischer-Tropsch reaction typically produces a mixture of gaseous hydrocarbons, liquid hydrocarbons, and waxes, having a number of carbon atoms varying from to 100 or more, and having different molecular weights. Depending on the molecular weight distribution, these mixtures are suitable for different uses. Mixtures containing liquid hydrocarbons, for example, can be subjected to further treatment in order to obtain gasoline, as well as medium distillates. The waxes can be subjected to a further treatment in order to be converted to liquid and/or gaseous hydrocarbons. Consequently, in order to use Fischer-Tropsch reactions for the subsequent production of fuel, it is desirable to increase the production of liquid hydrocarbons and/or of waxes, such as hydrocarbons having at least 5 carbon atoms per molecule ($C_{5+}$ hydrocarbons).

In addition to mixtures of hydrocarbons, the Fischer-Tropsch reaction also generates water according to the following equation:

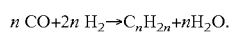

$$n\,CO + 2n\,H_2 \rightarrow C_nH_{2n} + nH_2O.$$

The production of water is quite significant as a mole of water is produced for each mole of carbon monoxide converted to hydrocarbons. Typically, when non-shifting catalysts are used, for example, cobalt and/or ruthenium, the reaction known as "water-gas-shift" is minimum so that the total production of water is close to that of the stoichiometric reaction. For shifting catalysts, for example, iron, the reaction known as "water-gas-shift" is more significant so that the total production of water is always considerable but lower than that of the stoichiometric reaction.

Before purification, the water coming from the Fischer-Tropsch reaction is generally subjected to preliminary separations. Typically, it passes through a three-phase separator from which an organic condensate is obtained, together with a vapour phase and an aqueous phase, which still contains organic compounds dissolved and in suspension, and is preferably treated in a coalescence filter.

The water thus separated remains contaminated by hydrocarbon compounds, typically less than 1000 ppm, and by oxygenated compounds, soluble in water. The amount of contaminants is in relation to the catalyst and reaction conditions, in particular temperature and pressure. With an increase in the reaction temperature, the overall amount of oxygenated compounds increases, the group of organic acids more significantly.

The main oxygenated contaminants are light alcohols such as methanol and ethanol, indicatively present in an amount of from 0.5% by weight to 5% by weight. Heavier alcohols (for example, propanol, butanol, pentanol, etc.) and other oxygenated compounds, such as aldehydes (for example, acetaldehyde, propionaldehyde, butyraldehyde, etc.), ketones (acetone, methylpropylketone, etc.) and acids (for example, formic acid, acetic acid, propionic acid, butyric acid, isobutyric acid, valeric acid, hexanoic acid, heptanoic acid, octanoic acid, etc.), are also present in lower amounts, the latter being indicatively present at concentrations lower than 1.5% by weight. The amount of compounds present, within each group, decreases with an increase in the molecular weight, and compounds with up to 25 carbon atoms are included. The water can also contain small amounts of nitrogenous and sulfurated compounds deriving from the feedstock used, in addition to traces of metals which come from the reactor. The metals can also be present in the form of suspended solids.

The water coming from the Fischer-Tropsch reaction consequently does not have a commercial value and cannot be disposed of as such due to the organic compounds present in the same which can cause some drawbacks. Oxygenated organic compounds (in particular, the acids), for example, give corrosive properties, the hydrocarbons the tendency to form foams (foaming).

Furthermore, rainwater or other service waters present in the production site, can be added to the water coming from the Fischer-Tropsch reaction.

A water treatment plant coming from the Fischer-Tropsch reaction is therefore necessary for both the re-use of the same within the Fischer-Tropsch process (for example, as process water or as cooling water in the reaction section), and also for its disposal outside or for other further uses (for example, as water for irrigation or drinking water).

The treatment or the combination of treatments of the water coming from the Fischer-Tropsch reaction is determined by the restrictions imposed by its final use and by the organic compounds present therein.

The treatment plant of water coming from the Fischer-Tropsch reaction, for example, can be of the biological type, which can be preceded by a treatment, typically distillation and/or stripping, to remove the most volatile organic compounds. The water deriving from the biological treatment is then normally subjected to a further finishing treatment to remove the solids and, if necessary, also the residual salts from the biological treatment. An approach of this type is described, for example, in the U.S. Pat. No. 7,166,219, U.S. Pat. No. 7,150,831, or in the International Patent Application WO 2005/113426.

Alternatively, the water coming from the Fischer-Tropsch reaction can be subjected to a treatment of the physico-chemical type. The U.S. Pat. No. 6,462,097, for example, describes a process in which after the stripping treatment, an adsorption step on activated carbons is provided. The vapour flow deriving from the stripping treatment can be advantageously recycled to the production section of the synthesis gas. Similar processes are also described, for example, in the U.S. Pat. No. 6,225,358, U.S. Pat. No. 5,053,581, U.S. Pat. No. 5,004,862, in which the organic compounds, for example $C_1$ to $C_6$ alcohols, present in the water coming from the Fischer-Tropsch reaction, are potentially brought back and then upgraded to simple molecules such as $CO_x/H_2$ (synthesis gas).

Other types of treatment, of the physico-chemical type, allow one or more aqueous streams enriched in organic compounds to be separated.

The United States Patent Application US 2004/0262199, for example, describes the possibility of separating, by distillation, a prevalently alcoholic stream with a content of non-acid compounds (NAC) ranging from 55% by weight to a maximum of 85% by weight. This stream can be used as fuel or alternatively it can be further processed to recover valuable products.

The formation, by treatments of the physico-chemical type, of one or more streams enriched in various groups of organic compounds, contemporaneously with the production of water purified to the required degree, is described, for example, in the U.S. Pat. No. 7,153,432 which proposes a process with at least two steps, the first a distillation step and the second a separation step with membranes, and optionally, if necessary, other additionally steps for bringing the purified water to the required degree of purity.

U.S. Pat. No. 7,153,432, in particular, describes a purification process of the water co-produced in the Fischer-Tropsch reaction which comprises: (a) subjecting the water co-produced in the Fischer-Tropsch reaction to distillation or to liquid-liquid extraction in order to remove at least a part of the alcohols present in said water and to produce a first stream enriched in water; and (b) subjecting said first stream enriched in water to a separation process by means of membrane which allows at least some of the solids in suspension to be removed together with some organic acids in order to obtain purified water. Said separation process by means of membrane can be selected from the group comprising: microfiltration, ultrafiltration, inverse osmosis, pervaporation.

Further uses of the water coming from the Fischer-Tropsch reaction are known in the art.

International Patent Application WO 2005/113426, for example, describes a method for the use of the water coming from the Fischer-Tropsch reaction carried out at a low temperature, which includes the phase of feeding the water coming from said reaction to a saturator contained in the production unit of the synthesis gas in order to saturate the stream of gaseous hydrocarbons fed to said unit.

U.S. Pat. No. 7,323,497 describes a process for the synthesis of hydrocarbons comprising: (a) subjecting a mixture of hydrocarbons and steam to a catalytic steam reforming process in order to obtain a partially reformed gas; (b) subjecting the partially reformed gas to a partial oxidation with a gas containing oxygen and bringing the resulting gas towards equilibrium by means of a steam reforming catalyst in order to obtain a mixture of reformed synthesis gas; (c) cooling the mixture of reformed synthesis gas below the dew point of the steam in order to condense the water and to separate the condensed water in order to obtain a water-free synthesis gas; (d) synthesizing the hydrocarbons from said water-free synthesis gas by means of the Fischer-Tropsch reaction; and (e) separating the hydrocarbons from the water co-produced; characterized in that at least a part of said co-produced water is fed to a saturator in which it comes into contact with a feedstock of hydrocarbons thus forming a mixture of hydrocarbons and steam to be subjected to a catalytic steam reforming.

U.S. Pat. No. 6,533,945 describes a process for the treatment of wastewater coming from a hydrocarbon synthesis reactor (for example, a Fischer-Tropsch reactor), which comprises mixing said wastewater with a solid organic fuel (for example, coal) in order to form a slurry; sending said slurry to a gasifier in which it is reacted with steam and oxygen to produce synthesis gas.

The Applicant has observed, however, that the processes described above can have various drawbacks. Feeding the whole aqueous stream coming from the Fischer-Tropsch reaction directly to a saturator, for example, can cause the formation of a high amount of blowdown stream leaving said saturator, said blowdown stream being enriched in organic acids, with consequent problems relating to its disposal and/or to its re-use. Said blowdown stream, in fact, must generally be subjected to complex purification treatments before being disposed of and/or re-used with a consequent increase in the process costs.

The Applicant has faced the problem of finding a process that allows at least a part of the aqueous stream coming from the Fischer-Tropsch reaction to be used as process water in the production plant of the synthesis gas, subsequently sent to the Fischer-Tropsch plant for the production of hydrocarbons. In particular, the Applicant has faced the problem of finding a process which allows a decrease in the amount of blowdown stream leaving the saturator.

It has now been found that by subjecting the aqueous stream deriving from the Fischer-Tropsch reaction to pervaporation, it is possible to obtain an aqueous stream enriched in oxygenated organic compounds, in particular alcohols, (retentate side) which can be sent to a saturator obtaining a gaseous stream leaving the saturator, subsequently sent to a synthesis gas production plant. In particular, said aqueous stream enriched in oxygenated organic compounds can be used in the production of synthesis gas both as a steam source and, thanks to the presence of said oxygenated organic compounds, as a hydrogen and carbon source, thus increasing the production of said synthesis gas. It has also been found that said process allows a smaller amount of blowdown stream leaving the saturator to be obtained, with respect to the processes described above (i.e. an amount of blowdown stream lower than or equal to 10% by weight with respect to the total weight of the aqueous stream fed to said saturator) and to send, consequently, a smaller amount of said blowdown stream to the subsequent purification treatment, with a consequent reduction in the complexity and in the costs of the process.

According to a first aspect, the present invention therefore relates to a process for the purification of an aqueous stream coming from the Fischer-Tropsch reaction which comprises:
feeding said aqueous stream containing the organic reaction by-products to one or more pervaporation units, said one or more pervaporation units comprising at least one hydrophilic pervaporation membrane, obtaining two outgoing streams:
an aqueous stream (i), on the side of the retentate, enriched in alcohols having from 1 to 20 carbon atoms, preferably from 1 to 8 carbon atoms, comprising organic acids having from 1 to 10 carbon atoms, preferably from 2 to 8 carbon atoms, in an amount lower than or equal to 0.5% by weight, preferably ranging from 0.01 by weight to 0.2% by weight, with respect to the total weight of said aqueous stream (i), and other optional volatile compounds;
an aqueous stream (ii), on the side of the permeate, enriched in water;
feeding said aqueous stream (i) to a saturator;
feeding the process gas to said saturator obtaining a gaseous stream (iii) leaving the saturator;
feeding said gaseous stream (iii) to the synthesis gas production plant.

According to a preferred embodiment of the present invention, said gaseous stream (iii) is fed to catalytic steam reforming.

For the purposes of the present invention and of the following claims, the definitions of the numerical ranges always comprise the extremes, unless otherwise specified.

The Fischer-Tropsch reaction can be advantageously carried out as described in U.S. Pat. No. 6,348,510 whose content is considered incorporated herein as reference.

The aqueous stream (i) has a concentration of alcohols preferably higher than or equal to 1% by weight, more preferably ranging from 1.5% by weight to 10% by weight, with respect to the total weight of said aqueous stream (i).

The aqueous stream (ii) has a concentration of water preferably higher than or equal to 95% by weight, more preferably ranging from 99.9% by weight to 99% by weight, with respect to the total weight of said aqueous stream (ii).

The aqueous stream (ii) has a concentration of alcohols and of organic acids preferably lower than or equal to 2.5% by weight, more preferably ranging from 0.01% by weight to 1% by weight, with respect to the total weight of said aqueous stream (ii).

Said aqueous stream (i) preferably comprises an amount of alcohols and of organic acids higher than or equal to 60% by weight, more preferably ranging from 75% by weight to 95% by weight, with respect to the total weight of the alcohols and of the acids present in the aqueous stream fed to said one or more pervaporation units.

Said aqueous stream (ii) preferably comprises an amount of alcohols and of organic acids lower than or equal to 40% by weight, more preferably ranging from 5% by weight to 25% by weight, with respect to the total weight of the alcohols and of the acids present in the aqueous stream fed to said one or more pervaporation units.

The aqueous stream (i) and the aqueous stream (ii) can optionally contain salts of the organic acids contained therein. If present, however, said salts are in an amount lower than 10% by weight with respect to the total amount of said organic acids.

For the purposes of the present description and of the following claims, the term "pervaporation unit" refers to the whole apparatus necessary for carrying out the pervaporation which typically includes a feeding pump, a feeding preheater, at least one pervaporation hydrophilic membrane, an interphase heat exchanger, a vacuum system for evaporating the aqueous stream on the permeate side or, alternatively, a carrier stream (sweep gas) for evaporating the aqueous stream on the permeate side, a system which allows the evaporated permeate to be brought, either partially or completely, to a temperature lower than or equal to the so-called dew point, at the operating pressure adopted, in order to condense it.

For the purposes of the present description and of the following claims, the term "other volatile compounds", optionally present in said aqueous stream (i), refers to compounds such as, for example, hydrocarbons, aldehydes, ketones, or mixtures thereof.

In said one or more pervaporation units, in addition to the formation of the above aqueous streams (i) and (ii) indicated above, occurs also the elimination of the incondensable compounds present in the aqueous stream coming from the Fischer-Tropsch reaction.

For the purposes of the present description and of the following claims, the term "incondensable compounds" refers to traces of synthesis gas (e.g., hydrogen and/or carbon monoxide) optionally present in the aqueous stream coming from the Fischer-Tropsch reaction fed to said one or more pervaporation units. According to a preferred embodiment of the present invention, said hydrophilic membrane can be selected from:
  ceramic hydrophilic membranes comprising inorganic compounds such as, for example, silica, titania, zirconia, zeolites, or mixtures thereof, said inorganic compounds being optionally doped;
  hydrophilic membranes comprising methylated-silica;
  organic/inorganic hybrid hydrophilic membranes such as, for example, the membranes described in the International Patent Application WO 2007/081212 whose content is incorporated herein as reference.

Said ceramic hydrophilic membrane is preferably selected from ceramic hydrophilic membranes comprising silica, zirconia, or mixtures thereof.

Said ceramic hydrophilic membranes generally comprise a support layer based on α-alumina, on which a "dense" active layer made of ceramic material is deposited, which can be selected, for example, from silicon oxides, titanium oxides, zirconium oxides, zeolites, or mixtures thereof.

In order to improve the adhesion between the support layer and the "dense" active layer and to reduce the surface roughness, an intermediate layer based on γ-alumina can be applied.

Examples of ceramic hydrophilic membranes which can be used for the purposes of the present invention and which are commercially available are the products Pervap® SMS of Sulzer Chemtech, or the ceramic membranes of Pervatech BV.

The above-mentioned hydrophilic membrane can be in the form of flat disks, tubular membranes, or in other useful forms.

The aqueous stream containing the organic by-products of the reaction is preferably fed to said one or more pervaporation units at a temperature ranging from 50° C. to 150° C., more preferably from 60° C. to 120° C.

In the feeding side (retentate side) of said one or more pervaporation units, it is preferable to operate at a pressure ranging from 0.7 bar to 5 bar, more preferably from 1 bar to 2.5 bar.

In the permeate side of said one or more pervaporation units, it is preferable to operate at a pressure ranging from 0.0005 bar to 0.25 bar, more preferably from 0.005 bar to 0.2 bar.

The specific flow (kg of permeate per square meter of hydrophilic membrane surface per hour) ranges from 0.05 kg/($m^2$×h) to 20 kg/($m^2$×h), more preferably from 0.1 kg/($m^2$×h) to 10 kg/($m^2$×h).

As specified above, the saturator generally has the function of providing the steam necessary for saturating the process gas, preferably natural gas, usually methane, before feeding this to the synthesis gas production plant. In the saturator, the water is generally put in contact with the above preheated process gas. For the purposes of the present invention, the saturator can operate either in countercurrent or in equicurrent, with or without external recirculation.

Any type of saturator known in the art can be advantageously used for the purposes of the present invention. Specific examples of saturators which can be advantageously used are: saturators of the vertical tubes type, saturators of the spray tower type, saturators of the baffle tower type, saturators of the perforated plate tower type, saturators of the packed tower type, saturators of the wetted wall tower type, and the like.

Operating according to the process object of the present invention, two streams leave the saturator:
  a gaseous stream (iii); and
  a blowdown stream (iv) in an amount lower than or equal to 10% by weight, preferably ranging from 2% by weight to 9% by weight, with respect to the total weight of the aqueous stream (i) fed to said saturator, said blowdown stream (iv) comprising part of the acids present in said aqueous stream (i).

The aqueous stream (iv) has a concentration of acids preferably higher than or equal to 20% by weight, more preferably ranging from 25% by weight to 70% by weight, with respect to the total weight of the acids present in said aqueous stream (i).

According to the process object of the present invention, said blowdown stream (iv) can be sent to subsequent purification treatments such as, for example: ion exchange resins, reverse osmosis, nanofiltration, evaporation, crystallization, electrodialysis, biological treatments. Before being subjected to said purification treatments, said aqueous stream (iv) is preferably subjected to neutralization according to methods known in the art such as, for example, by the addition of at least one base (e.g., sodium hydroxide).

According to a preferred embodiment of the present invention, the saturator operates at a temperature ranging from 160° C. to 200° C. and at a pressure ranging from 30 bar absolute (bara) to 60 bar absolute (bara).

Before being fed to said one or more pervaporation units, the aqueous stream coming from the Fischer-Tropsch reaction can be advantageously subjected to microfiltration, ultrafiltration, in order to eliminate the suspended solids optionally present in said aqueous stream.

Depending on the final use and, consequently, on the degree of purity to be obtained, said aqueous stream (ii), can be subjected to further purification treatments such as, for example, ion exchange resins, reverse osmosis, crystallization, electrodialysis, biological treatments. Said aqueous stream (ii) can be preferably subjected to biological treatments. Before being subjected to said purification treatments, said aqueous stream (ii) can be preferably subjected to neutralization according to methods known in the art such as, for example, by the addition of at least one base (e.g., sodium hydroxide).

It has to be noted that said purification treatments, both in the case of said blowdown stream (iv) which, as indicated above, is obtained in a modest amount, and in the case of said aqueous stream (ii) which is enriched in water and therefore partially purified, requires non-complex treatments with a consequent reduction in the process costs.

The present invention will now be illustrated in greater detail through an embodiment with reference to FIG. 1 included below.

The process, object of the present invention, can be carried out as represented, for example, in FIG. 1.

In this case, the aqueous stream (1) coming from the Fisher-Tropsch reaction is fed to a pervaporation unit (2) comprising a hydrophilic membrane, in particular a ceramic hydrophilic membrane, obtaining an aqueous stream (3), on the permeate side, enriched in water and an aqueous stream (4), on the retentate side, enriched in alcohols.

Said aqueous stream (4) is fed to the saturator (5) to which the process gas (8) (e.g., natural gas) is also fed.

A gaseous stream (7) leaves the head of the saturator (5), and is fed to a synthesis gas production plant, in particular to the steam reforming section (not represented in FIG. 1).

The blowdown stream (6), as specified above, can be sent to subsequent purification treatments (not represented in FIG. 1).

If necessary, depending on the final use, said aqueous stream (3) can be sent to further purification treatments, preferably biological treatments (not represented in FIG. 1).

Some illustrative and non-limiting examples are below provided for a better understanding of the present invention and for its embodiment.

EXAMPLE 1

After carrying out the Fisher-Tropsch reaction as described in U.S. Pat. No. 6,348,510 (IFP-ENI) and with reference to FIG. 1, the water which is separated by decanting from the reaction effluent [aqueous stream (1)] is fed to a flask situated on a technical balance and sent, by means of a volumetric pump, to the "liquid side" chamber (i.e. retentate side) of a laboratory pervaporation cell.

The water, which is kept in recirculation by means of a pump, between the flask and the pervaporation cell at 2 l/h, is characterized by the presence of alcohols having from 1 to 6 carbon atoms and of organic acids having from 1 to 6 carbon atoms.

Upon gas-chromatographic analysis, the main alcohols prove to be:
- methanol: 3.17% by weight with respect to the total weight of the water fed [aqueous stream (1)];
- ethanol: 1.28% by weight with respect to the total weight of the water fed [aqueous stream (1)];
- propanol: 0.69% by weight with respect to the total weight of the water fed [aqueous stream (1)];
- butanol: 0.37% by weight with respect to the total weight of the water fed [aqueous stream (1)].

The pervaporation cell houses a tubular ceramic pervaporation hydrophilic membrane (selective layer based on silica, support based on α-alumina, intermediate layer based on γ-alumina, of the supplier Pervatech BV), having an outer diameter of 10 mm, an internal diameter of 7 mm, a height of 225 mm, equivalent to 0.005 m² of surface.

The pervaporation cell comprises a chamber outside the tubular membrane ("vapour side" or permeate side) and a chamber inside said tubular membrane ("liquid side" or retentate side). The two chambers are in contact only through said membrane.

The overall liquid hold up (flask+pervaporation cell) is equal to 2260 g.

The pervaporation cell is also housed in an oven which allows the test to be conditioned at the desired temperature: in this case 80° C.

The "vapour side" (i.e. the permeate side) is brought under vacuum by suction with a membrane pump and is maintained at pressures of 11-13 mBar. The vapour is then condensed in a condenser which is kept in a cryostatic bath at −10° C.

The conditions described above are maintained for 150 hours during which the specific permeate flow proved to be 1.7 kg/(m²×h), allowing a total of 1265 g of permeate to be collected.

The overall balance of material is equal to 94% (weight of permeate-condensate+samples for analysis+final retentate/weight initially charged into the flask).

The aqueous stream (4) enriched in alcohols proved to have the following composition, obtained by means of gas-chromatography.
- methanol: 5.55% by weight with respect to the total weight of said aqueous stream (4);
- ethanol: 2.35% by weight with respect to the total weight of said aqueous stream (4);
- propanol: 1.29% by weight with respect to the total weight of said aqueous stream (4);
- butanol: 0.69% by weight with respect to the total weight of said aqueous stream (4).

Said aqueous stream (4) proved to have a concentration of alcohols equal to 94% by weight with respect to the total weight of the alcohols present in the water fed to the pervaporation cell [aqueous stream (1)].

The aqueous stream (3) enriched in water proved to have the following composition, obtained by means of gas chromatography:
- water: 99.31% by weight with respect to the total weight of said aqueous stream (3);
- methanol: 0.54% by weight with respect to the total weight of said aqueous stream (3);
- ethanol: 0.10% by weight with respect to the total weight of said aqueous stream (3);
- propanol: 0.03% by weight with respect to the total weight of said aqueous stream (3);
- butanol: 0.02% by weight with respect to the total weight of said aqueous stream (3).

Said aqueous stream (3) proved to have a concentration of alcohols equal to 0.69% by weight with respect to the total weight of said aqueous stream (3).

EXAMPLE 2

The aqueous stream (4) obtained in Example 1, was fed to the saturator (5), at a nominal flow-rate equal to 8.5 g/h.

The saturator (5) is equipped with a heating system and operates at a pressure of 40 bar and at a temperature of 180° C. Natural gas was then sent, in countercurrent, to the saturator (5) at a nominal flow-rate equal to 29000 Ncm³/h.

A blowdown stream (6) was obtained at the outlet of the bottom of the saturator (5), at a nominal flow-rate equal to 0.65 g/h.

A saturated gaseous stream (7) having a nominal flow-rate equal to 38700 Ncm³/h was obtained at the outlet of the head of the saturator (5), to be used for the production of synthesis gas.

The invention claimed is:

1. A process for purifying a feed aqueous stream from a Fischer-Tropsch reaction, the process comprising:
   feeding the feed aqueous stream to a pervaporation unit to obtain a first aqueous stream and a second aqueous stream;
   feeding the first aqueous stream and a process gas to a saturator to obtain a gaseous stream; and
   feeding the gaseous stream to a synthesis gas production plant;
   wherein:
   the feed aqueous stream comprises organic reaction by-products from the Fischer-Tropsch reaction;
   the pervaporation unit comprises a hydrophilic pervaporation membrane;
   the first aqueous stream is from a retentate side of the hydrophilic pervaporation membrane;

the first aqueous stream is enriched in alcohols having from 1 to 20 carbon atoms relative to the feed aqueous stream;

the first aqueous stream comprises organic acids having from 1 to 10 carbon atoms in an amount 0.5% by weight or less;

the first aqueous stream optionally comprises volatile compounds;

the second aqueous stream is from a permeate side of the hydrophilic pervaporation membrane; and the second aqueous stream is enriched in water relative to the feed aqueous stream.

2. The process according to claim 1, wherein the gaseous stream is fed to a catalytic steam reforming apparatus.

3. The process according to claim 1, wherein the first aqueous stream comprises alcohols in an amount of 1% by weight or greater.

4. The process according to claim 1, wherein the second aqueous stream comprises water in an amount of 95% by weight or greater.

5. The process according to claim 1, wherein the second aqueous stream comprises alcohols and organic acids in an amount of 2.5% by weight or less.

6. The process according to claim 1, wherein the first aqueous stream comprises alcohols and organic acids in an amount of 60% by weight or greater relative to a total weight of alcohols and organic acids present in the feed aqueous stream.

7. The process according to claim 1, wherein the second aqueous stream comprises alcohols and organic acids in an amount of 40% by weight or less relative to a total weight of alcohols and organic acids present in the feed aqueous stream.

8. The process according to claim 1, wherein the hydrophilic membrane is selected from:

a ceramic hydrophilic membrane comprising an inorganic compound;

a hydrophilic membrane comprising methylated-silica; and an organic/inorganic hydrophilic hybrid membrane.

9. The process according to claim 8, wherein the hydrophilic membrane is a ceramic hydrophilic membrane comprising at least one of silica and zirconia.

10. The process according to claim 1, wherein the feed aqueous stream is fed to the pervaporation unit at a temperature of 50° C. to 150° C.

11. The process according to claim 10, wherein the feed aqueous stream is fed to the pervaporation unit at a temperature of 60° C. to 120° C.

12. The process according to claim 1, wherein the retentate side of the pervaporation unit operates at a pressure of 0.7 bar to 5 bar.

13. The process according to claim 12, wherein the retentate side of the pervaporation unit operates at a pressure of 1 bar to 2.5 bar.

14. The process according to claim 1, wherein the permeate side of the pervaporation unit operates at a pressure of 0.0005 bar to 0.25 bar.

15. The process according to claim 14, wherein the permeate side of the pervaporation unit operates at a pressure of 0.005 bar to 0.2 bar.

16. The process according claim 1, wherein:

a specific flow of the hydrophilic pervaporation membrane is 0.05 kg/(m$^2$×h) to 20 kg/(m$^2$×h); and the specific flow is measured as kg of permeate per square meter of surface of the hydrophilic membrane per hour.

17. The process according to claim 16, wherein the specific flow is 0.1 kg/(m$^2$×h) to 10 kg/(m$^2$×h).

18. The process according to claim 1, comprising feeding the first aqueous stream and the process gas to the saturator to obtain the gaseous stream and a blowdown stream;

wherein:

the blowdown stream is obtained in an amount of 10% by weight or less relative to the total weight of the first aqueous stream fed to the saturator; and the blowdown stream comprises part of acids present in the first aqueous stream.

19. The process according to claim 18, wherein the blowdown stream is obtained in an amount of 2% by weight to 9% by weight relative to the total weight of the first aqueous stream fed to the saturator.

20. The process according to claim 1, wherein the saturator operates at a temperature of 160° C. to 200° C. and a pressure of 30 bar absolute to 60 bar absolute.

* * * * *